United States Patent [19]

Paige et al.

[11] Patent Number: 5,086,926
[45] Date of Patent: Feb. 11, 1992

[54] DUAL THERMOS

[76] Inventors: Lawrence E. Paige, 507 N. Lincoln; Edward L. Nicholas, 131 N. Buchanan, both of Olathe, Kans. 66061

[21] Appl. No.: 563,065

[22] Filed: Aug. 6, 1990

[51] Int. Cl.5 ............................................. B65D 21/02
[52] U.S. Cl. .................... 206/542; 206/543; 206/546; 220/4.27; 220/23.83
[58] Field of Search ............... 206/541–550; 220/4.27, 23.83, 412, 420

[56] References Cited

U.S. PATENT DOCUMENTS

| | | | |
|---|---|---|---|
| 224,490 | 2/1880 | Sturges | 220/4.27 |
| 231,156 | 8/1880 | Doherty | 220/4.27 |
| D. 236,315 | 8/1975 | Russo . | |
| 628,888 | 7/1899 | Kirby | 220/4.27 |
| 1,142,932 | 6/1915 | Clark | 206/550 |
| 2,024,741 | 12/1935 | Osterman . | |
| 2,405,764 | 8/1946 | Smith . | |
| 2,462,461 | 2/1949 | Bird . | |
| 2,713,779 | 7/1955 | Fitzgibbons | 206/545 |
| 2,833,436 | 5/1958 | Ruderian . | |
| 3,067,896 | 12/1962 | Berg et al. | 220/4.27 |
| 3,143,205 | 8/1964 | Ruderian . | |
| 3,384,259 | 5/1968 | Hoffstadt | 206/550 |
| 3,465,905 | 9/1969 | Schottanes . | |
| 3,744,622 | 7/1973 | Weaver . | |
| 4,444,324 | 4/1984 | Grenell | 220/4.27 |

Primary Examiner—Jimmy G. Foster
Attorney, Agent, or Firm—Michael Yakimo, Jr.

[57] ABSTRACT

A food carrier comprising longitudinally-aligned and spaced-apart thermos bottles with a supporting storage compartment, bowl and cup. Interengageable annular threads about said bowl, cup, thermos bottles, storage compartment and intermediate spacer ring allow for a single thermos or dual thermos configuration according to the desires of the user. The carrier allows for transport of first and/or second liquids with accompanying utensils, condiments and the like. A cup may accompany either the single thermos configuration or dual thermos configuration according to the desires of the user.

19 Claims, 1 Drawing Sheet

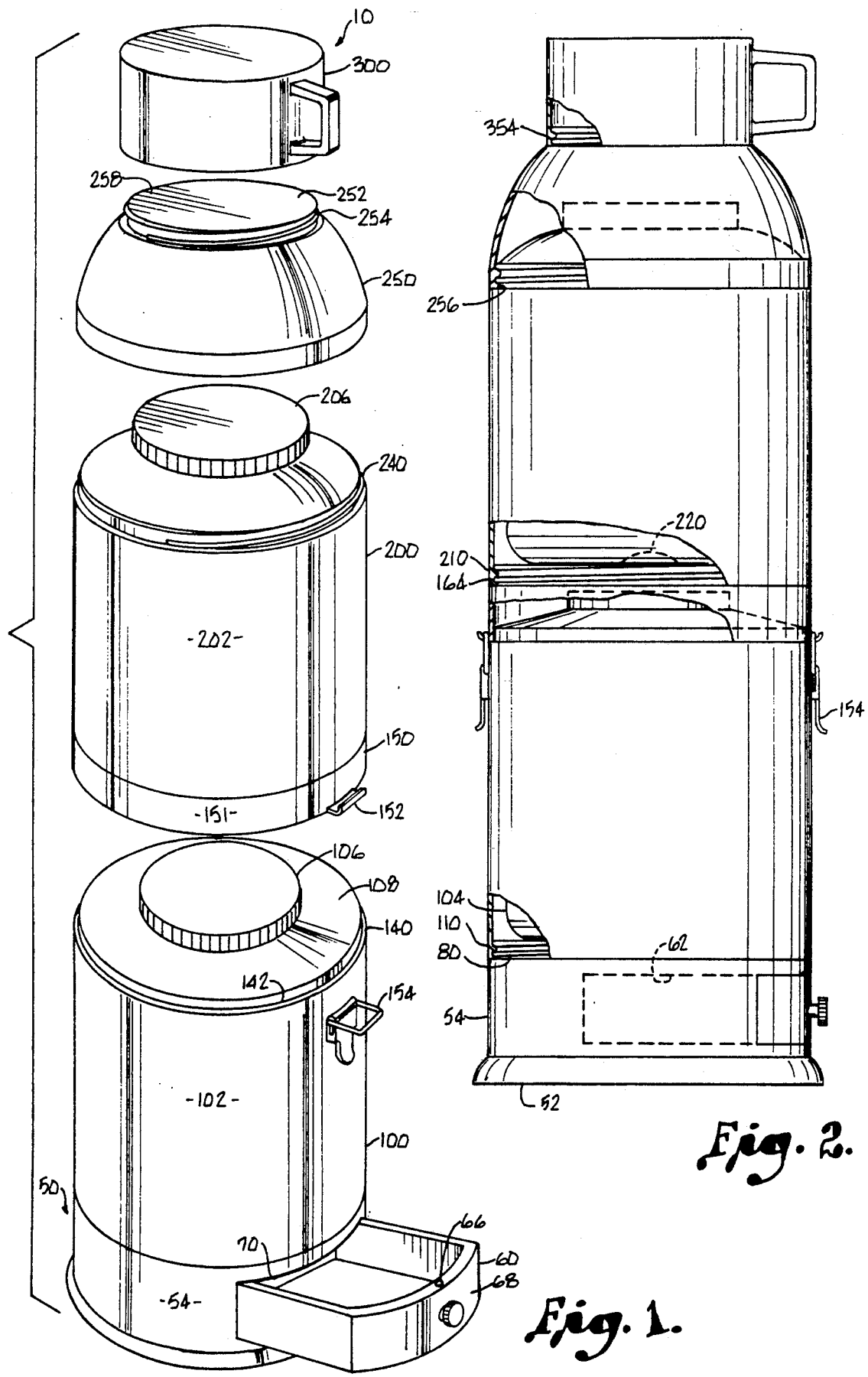

DUAL THERMOS

BACKGROUND OF THE INVENTION

This invention relates to a dual thermos container and more particularly to a food carrier which presents to the user the ability to separately store dual liquids while providing access to utensils, condiments, napkins and the like in an associated storage compartment.

The general use of multiple thermos bottles in a side-by-side or over/under configuration is known. Although assumably effective in their operation, such devices do not provide the user the ability to securely fasten the containers in an over/under relationship while providing the ability to store therein separate utensils, napkins, condiments, etc. Furthermore, in combination with the above it is desirable to provide to the user dual vessels to store the liquids therein.

Accordingly, it is a general object of this invention to address the above needs and thus to provide a food carrier with two separated thermos bottles while providing access to a bowl, cup and utensils stored in a separate compartment.

A more particular object of this invention is to provide a food carrier, as aforesaid, which has separated liquid thermos bottles in an over/under position for the storage of hot and/or cold liquids therein.

Another object of this invention is to provide a food carrier, as aforesaid, which has an associated storage compartment for the transport of napkins, condiments, utensils or the like therein.

Another particular object of this invention is to provide a food carrier, as aforesaid, which presents dual liquid vessels for the contents of the dual thermos therein.

Another object of this invention is to provide latching apparatus for securely fastening the thermos bottles in a separated over/under relationship for maintaining the temperatures of the separated liquids.

A further object of this invention is to provide a food carrier, as aforesaid, which can be used with either one or two thermoses while presenting the same accompanying advantages and results.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is a partially exploded view of the food carrier and illustrating the separated thermos bottles, bowl and cup with a drawer of the storage compartment in an open position;

FIG. 2 is an elevation view of the dual thermos shown in FIG. 1 with portions of the upper and lower thermos bottles broken away to illustrate the connecting means between the storage vessels, thermos bottles, spacer assembly and storage compartment.

DESCRIPTION OF THE PREFERRED EMBODIMENT

Turning more particularly to the drawings, FIG. 1 illustrates my now preferred embodiment of the dual thermos 10 in a partially exploded view. Generally, the thermos device 10 comprises a storage compartment 50, a first thermos assembly 100, a spacer assembly 150, a second or upper thermos assembly 200, a bowl assembly 250 and cup assembly 300.

The cylindrical storage compartment 50 presents a cylindrical support base 52 with a superiorly cylindrical support housing 54. Slidable into and out of the housing 54 is a storage drawer 60. Drawer 60 frictionally fits within a slot 62 along one side of the support housing 54. Lug 66 is positioned along the top of the front surface 68 of drawer 60. This lug 66 engages a depression in the top edge 70 of slot 62 in a friction fit relationship therebetween. This friction fit relationship between lug 66 and depression 67 precludes the drawer 60 from opening during transport.

About the top of the storage compartment 50 is an upstanding annular thread 80 for engagement with the lower thermos 100 as to be subsequently described.

The lower storage container or thermos 100 is of conventional thermos construction and comprises the cylindrical outer housing 102 with an insulated thermos element 104 therein. A lid 106 is positioned atop the spout of the upper surface of thermos 100 to allow for insertion/discharge of the liquid. Along the interior of the wall of housing 102 lies an annular thread or rim 110. This thread 110 functionally engages the upstanding annular thread 80 of the storage compartment 50. Upon such threadable engagement therebetween the thermos 100 is fastened atop the storage compartment 50.

Positioned atop the thermos 100 is an annular spacer assembly 150. The circular wall 151 of assembly 150 engages the annular shoulder 142 extending about the top surface 108 of thermos 100 in a friction fit relationship therebetween. Clamps 154 positioned on opposed sides of housing 100 wall 102 engage clamps 152 laterally extending from the side wall 151. This engagement further precludes separation of the spacer assembly 150 from thermos 100.

An annular thread 164 lies about the rim of spacer 150 and engages the internal threads 210 of the upper thermos 200. The upper thermos 200 is of conventional construction and comprises a housing 202 having a plurality of internal threads 210 at the lower edge thereof. A conventional insulated thermos 204 is located within the housing 202. Upon threadable engagement between the internal threads 210 of housing 200 and the threads 154 of spacer 150 the thermos 200 is positioned atop the spacer 150. It is herein noted that the top planar surface 166 of the storage assembly 150 presents an upstanding lug 167 which engages a depression 220 on the underside of the thermos 200. This lug 167 fits within the depression 220 so as to enhance the stability of the over/under relationship between the thermos 200 and the spacer 150.

The thermos 200 further presents a lid 206 at the top surface thereof for insertion and discharge of the liquid contents. An annular groove 240 is positioned about the top surface 242 of the thermos housing 202 for threadable engagement with the internal threads 256 of the bowl assembly 250. As such, the threads 256 of bowl assembly 250 functionally engage the threads 240 of thermos 200 so as to secure the bowl thereto for subsequent transport.

The base 258 of the bowl 252 presents external annular threads 254 for functional engagement with the internal threads 354 of the cup 300. Upon such engagement the assembly of the thermos as shown in FIG. 2 is complete.

It is herein noted that our apparatus allows for the transport of hot and/or cold liquid in the respective thermos assemblies 100, 200. The utilization of the spacer 150 presents an air space between the upper and lower thermoses 200, 100 so as to delimit undesirable heat transfer therebetween. Furthermore, the combination of the bow 250 and cup 300 presents liquid vessels for the storage of the liquids as discharged from the respective thermoses 100, 200. Finally, the storage compartment 50 provides access to the user of utensils, condiments, and the like.

We have found that the use of the clamping assemblies 152, 154 on the sides of the spacer 150 and lower thermos 100 in combination with the engagement of the lug 167 within the recess 220 of the upper thermos 200 enhances the stability of the assembled dual thermos 10.

It is also noted that thermos 200 may be used alone as the threads 240 away functionally engage threads of the storage compartment 50. If the first thermos 100 is to be singularly used, bowl threads 256 may functionally engage threads 164 of spacer 150. Accordingly, the thermoses 100, 200 can be singularly used with and without spacer 150 according to whether a single or dual thermos capability is desired.

It is to be understood that while a certain form of this invention have been illustrated and described, it is not limited thereto, except in so far as such limitations are included in the following claims and allowable functional equivalents thereof.

Having thus described the invention, what is claimed as new and desired to be secured by Letter Patent is:

1. In a thermal container for edibles having at least a first thermos, the improvement comprising:
   storage means underlying said first thermos comprising:
     a base for contact with an underlying support surface;
     a housing extending from said base;
     a slot in said housing;
     a drawer slidable within and out of said slot for storage of articles therein; and
     means for maintaining said drawer within said slot;
   means for joining said housing to said at least first thermos;
   a second thermos;
   means for joining said second thermos to said first thermos comprising:
     an annular shoulder about the top of said first thermos;
     spacer means comprising a rim having a configuration complementary to said annular shoulder so as to engage said shoulder in a nesting relationship therebetween and further comprising:
       a lug atop said rim;
       means located in said second thermos for a nesting relationship with said lug;
       thread means along a top of said rim;
       thread means along a bottom of said second thermos, said second thermos thread means functionally engaging said rim thread means to present said first and second thermoses in a longitudinally-aligned relationship with said nesting relationship enhancing the stability therebetween.

2. The device as claimed in claim 1 wherein said joining means comprises:
   an annular thread extending about said housing;
   a complementary annular thread extending about a bottom of said one thermos, said threads functionally engageable so as to connect said one thermos to said housing.

3. The device as claimed in claim 4 further comprising:
   a liquid vessel for separate storage of said edibles
   means for user-selectably joining said liquid vessel to said first or second thermoses.

4. The device as claimed in claim 3 wherein said user-selectable joining means comprises:
   an annular thread about an interior of said vessel;
   thread means about a top of said second thermos for engagement with said thread about said vessel, said thread engaging either said rim thread means or said thread means about said second thermos.

5. The device as claimed in claim 3 further comprising:
   a second liquid vessel for storage of edibles in said other container therein;
   means for joining said second vessel to said first vessel for transport.

6. The device as claimed in claim 1 further comprising:
   a first clamping means on said first thermos;
   a complementary clamping means on said rim of said spacer means, said clamping means engageable to secure relationship between said rim and said first thermos.

7. A thermal container for edibles having a single thermos or dual thermos capability, said container comprising:
   a support base;
   thread means on said support base;
   complementary thread means on a first thermos for functional engagement with said support base thread means;
   a spacer;
   a shoulder about said first thermos for nesting engagement with said spacer element;
   thread means about said spacer element;
   complementary thread means about a second thermos, said second thermos thread means functionally engageable with said spacer thread means or said support base thread means, said complementary thermos thread means presenting either a dual thermos capability upon engagement of said second thermos thread means with said spacer thread means or a single thermos capability upon engagement of said thread means on said first or second thermoses with said thread means on said base;
   at least one liquid vessel for edibles;
   means about said vessel for engagement with either said second thermos during said dual thermos capability or with said spacer thread means during said single thermos capability, said means comprising:
     a thread about said vessel for engagement with said spacer thread means or said thread means about said second thermos.

8. The device as claimed in claim 7 further comprising:
   a second liquid vessel; and
   means for joining said second vessel to said first vessel.

9. In a thermal container for edibles having at least a first thermos, the improvement comprising:
   storage means underlying said first thermos comprising:
     a base for contact with an underlying support surface;

a housing extending from said base;
a slot in said housing;
a drawer slidable within and out of said slot for storage of articles therein; and
means for maintaining said drawer within said slot;
means for joining said housing to said at least first thermos;
a second thermos;
means for joining said second thermos to said first thermos comprising:
  an annular shoulder about the top of said first thermos;
  spacer means comprising a rim having a configuration complementary to said annular shoulder so as to engage said shoulder in a nesting relationship therebetween;
  thread means along a top of said rim;
  thread means along a bottom of said second thermos, said second thermos thread means functionally engaging said rim thread means to present said first and second thermoses in a longitudinally-aligned relationship therebetween;
  a liquid vessel for separate storage of the edibles;
  means for user-selectably joining said liquid vessel to said first or second thermoses;
  a second liquid vessel for storage of edibles in said other container therein;
  means for joining said second vessel to said first vessel for transport.

10. The device as claimed in claim 9 wherein said housing joining means comprises:
  an annular thread extending about said housing;
  a complementary annular thread extending about a bottom of said one thermos, said threads functionally engageable so as to connect said one thermos to said housing.

11. The device as claimed in claim 9 wherein said spacer means further comprises:
  a lug atop said rim;
  means located in said second thermos for a nesting relationship with said lug, said nesting relationship enhancing the stability of said longitudinally-aligned thermoses.

12. The device as claimed in claim 9 wherein said user-selectable joining means comprises:
  an annular thread about an interior of said vessel;
  thread means about a top of said second thermos for engagement with said thread about said vessel, said thread engaging either said rim thread means or said thread means about said second thermos.

13. The device as claimed in claim 9 further comprising:
  a first clamping means on said first thermos;
  a complementary clamping means on said rim of said spacer means, said clamping means engageable to secure relationship between said rim and said first thermos.

14. In a thermal container for edibles having at least a first thermos, the improvement comprising:
  storage means underlying said first thermos comprising:
    a base for contact with an underlying support surface;
    a housing extending from said base;
    a slot in said housing;
    a drawer slidable within and out of said slot for storage of articles therein; and
    means for maintaining said drawer within said slot;
  means for joining said housing to said at least first thermos whereby to present a thermal container for transport of edibles and articles;
  a second thermos;
  means for joining said second thermos to said first thermos in a longitudinally-aligned relationship therebetween comprising:
    an annular shoulder about the top of said first thermos;
    spacer means comprising a rim having a configuration complementary to said annular shoulder so as to engage said shoulder in a nesting relationship therebetween;
    thread means along a top of said rim;
    thread means along a bottom of said second thermos, said second thermos thread means functionally engaging said rim thread means to present said first and second thermoses in a longitudinally-aligned relationship therebetween;
  a first clamping means on said first thermos;
  a complementary clamping means on said rim of said spacer means, said clamping means engageable to secure relationship between said rim and said first thermos.

15. The device as claimed in claim 14 wherein said housing joining means comprises:
  an annular thread extending about said housing;
  a complementary annular thread extending about a bottom of said one thermos, said threads functionally engageable so as to connect said one thermos to said housing.

16. The device as claimed in claim 14 wherein said spacer means further comprises:
  a lug atop said rim;
  means located in said second thermos for a nesting relationship with said lug, said nesting relationship enhancing the stability of said longitudinally-aligned thermoses.

17. The device as claimed in claim 14 further comprising:
  a liquid vessel for separate storage of edibles;
  means for user-selectably joining said liquid vessel to said first or second thermoses.

18. The device as claimed in claim 17 wherein said user-selectable joining means comprises:
  an annular thread about an interior of said vessel;
  thread means about a top of said second thermoses for engagement with said thread about said vessel, said thread engaging either said rim thread means or said thread means about said second thermos.

19. The device as claimed in claim 17 further comprising:
  a second liquid vessel for storage of edibles in said other container therein;
  means for joining said second vessel to said first vessel for transport.

* * * * *

UNITED STATES PATENT AND TRADEMARK OFFICE
CERTIFICATE OF CORRECTION

PATENT NO. : 5,086,926
DATED      : February 11, 1992
INVENTOR(S) : LAWRENCE E. PAIGE and EDWARD L. NICHOLAS It is certified that error appears in the above—identified patent and that said Letters Patent is hereby corrected as shown below:

Column 3, line 7, delete "bow" and substitute --bowl--.

Column 3, line 18, delete "away" and substitute --may--.

Column 3, line 31, delete "Letter" and substitute --Letters--.

Column 3, line 65, before the word "joining" insert --housing--.

Column 4, line 3, delete "4" and substitute --1--.

Column 4, line 5, after the word "edibles" insert a --;--.

Column 4, line 54, delete "comprising:" and substitute --comprises:--.

Column 6, line 10, after the word "of" insert --the--.

Column 6, line 54, delete "thermoses" and substitute --thermos--

Signed and Sealed this

Eighth Day of June, 1993

Attest:

MICHAEL K. KIRK

*Attesting Officer*   *Acting Commissioner of Patents and Trademarks*